United States Patent [19]

Merchant

[11] Patent Number: 5,457,700
[45] Date of Patent: Oct. 10, 1995

[54] ASYNCHRONOUS TRANSFER MOD (ATM) TRANSMISSION TEST CELL GENERATOR

[75] Inventor: Shahrukh S. Merchant, Londonderry, N.H.

[73] Assignee: AT&T IPM Corp., Coral Gables, Fla.

[21] Appl. No.: 361,002

[22] Filed: Dec. 21, 1994

Related U.S. Application Data

[63] Continuation of Ser. No. 931,237, Aug. 17, 1992, abandoned.

[51] Int. Cl.$^6$ .............................................. G01R 31/317
[52] U.S. Cl. .................... 371/27; 370/94.1; 370/100.1; 370/111
[58] Field of Search .......................... 371/27; 370/94.1, 370/100.1, 111

[56] References Cited

U.S. PATENT DOCUMENTS

| | | | |
|---|---|---|---|
| 4,302,843 | 11/1981 | Bauernfeind et al. | 371/27 |
| 4,397,020 | 10/1981 | Howson | 370/105 |
| 5,072,447 | 12/1991 | Perloff et al. | 371/27 |
| 5,148,434 | 9/1992 | Richardson | 371/27 |
| 5,257,311 | 10/1993 | Naito et al. | 380/48 |

FOREIGN PATENT DOCUMENTS

| | | | |
|---|---|---|---|
| 90201219 | 11/1991 | European Pat. Off. | H04L 12/26 |
| 2660501 | 3/1990 | France | H04L 5/22 |

OTHER PUBLICATIONS

Telecom Report, vol. 14, No. 1, 1991, pp. 52–55, by H. W. Arweiler.
Globecom '90 Dec. 1990, San Diego, Ca. U.S., pp. 1445–1449, "Traffic Experimentation in ATM Testbed" by O. Aboul–Magd et al.
European Search Report dated Nov. 23, 1993, regarding EPO Application Number EP 93 30 6180.

Primary Examiner—Ellis B. Ramirez
Assistant Examiner—Thomas Peeso
Attorney, Agent, or Firm—Thomas Stafford

[57] ABSTRACT

ATM test cells are generated and inserted into an ATM combined data stream in such a manner that a desired average insertion rate is maintained. The desired average insertion rate is obtained by enabling generation of and insertion of test cells into each idle cell of the ATM combined data stream so long as the actual number of test cell being inserted does not exceed a number that should have been inserted.

18 Claims, 1 Drawing Sheet 5,457,700

ASYNCHRONOUS TRANSFER MOD (ATM) TRANSMISSION TEST CELL GENERATOR

This is a continuation of application Ser. No. 07/931,237, filed Aug. 17, 1992 now abandoned.

TECHNICAL FIELD

This invention relates to packet transmission and, more particularly, to the generation of test cells.

BACKGROUND OF THE INVENTION

Arrangements are known for generating and inserting signal test patterns or sequences to evaluate the performance of transmission facilities. Such prior known arrangements typically inserted the test pattern or sequence at some predetermined place in a particular data stream at some uniform rate.

In more recently developed transmission systems, for example, asynchronous transfer mode (ATM) systems, it is necessary to evaluate the performance of so-called logical channels, each of which comprises an individual packetized data stream. A plurality of such logical channels form a combined data stream which is typically transmitted over a single transmission medium. The ATM transmission is on a so-called cell basis, wherein each cell comprises a fixed length packet. If there are no data to fill the fixed length packet, so-called idle cells are inserted. Additionally, the individual packets or cells of any particular logical channel in the combined data stream are not in any prearranged or preallocated position relative to individual packets or cells in other logical channels. They are only in a predetermined sequence relative to the other packets, i.e., cells, in their individual logical channel. Consequently, there is no fixed bandwidth to insert a test pattern or sequence as in the prior known arrangements. The test pattern, i.e., the test cell, in an ATM system can only be inserted when there are idle cells or when there are no useful cells being inputted, both hereinafter referred to as test cell insertion opportunity intervals. Such test cell insertion opportunity intervals typically occur non-uniformly. However, it is desirable to insert the desired test cell at some predetermined average rate. Because of the non-uniform nature of opportunities for inserting the test cell in ATM systems, prior arrangements do not operate satisfactorily.

SUMMARY OF THE INVENTION

The problems related to prior test cell generation and insertion arrangements and their relationship to ATM systems are overcome in systems having non-uniform opportunities for test cell insertion, in accordance with the principles of the invention, by enabling test cell insertion into each test cell insertion opportunity interval in the combined data stream so long as the actual number of test cells being inserted does not exceed a number that should have been inserted. In this manner, a desired predetermined average test cell insertion rate is obtained in a combined data stream having non-uniformly occurring idle cells.

In an embodiment of the invention, the desired average rate of test cell insertion in the combined data stream is obtained by generating a first indication that a predetermined number of cell intervals has occurred, i.e., a representation that a predetermined time interval has elapsed, generating a second indication that a predetermined number of test cell insertions has actually occurred, and in response to the first indication and to the second indication, generating a test cell insertion enable signal so long as the number of test cells that should have been inserted exceeds the number of test cell insertions that have actually occurred.

In an exemplary embodiment of the invention, the desired average rate of test cell insertion for the combined data stream is obtained by employing a programmable counter to yield the first indication upon the occurrence of a predetermined number of test cells and a programmable counter to yield the second indication upon the predetermined number of test cells actually having been inserted. Each of these counters is reloaded with a particular initial count after completing its particular counting cycle. The particular initial counts for each of the test cell and cell counters is initially programmed upon provisioning the desired test cell bandwidth. Then, the effective test cell insertion bandwidth is defined as $(n/m) \times (C)$, where C is the cell clock rate and it is desired to insert "n" test cells in "m" cell intervals. This is realized by loading "n–1" in the test cell counter upon completion of its counting cycle and "m–1" in the cell counter upon completion of its counting cycle.

In another embodiment of the invention, the particular initial counts of the cell counter and the test cell counter may be controllably changed in order to adaptively adjust the average rate of test cell insertion.

DETAILED DESCRIPTION

Figure 1:
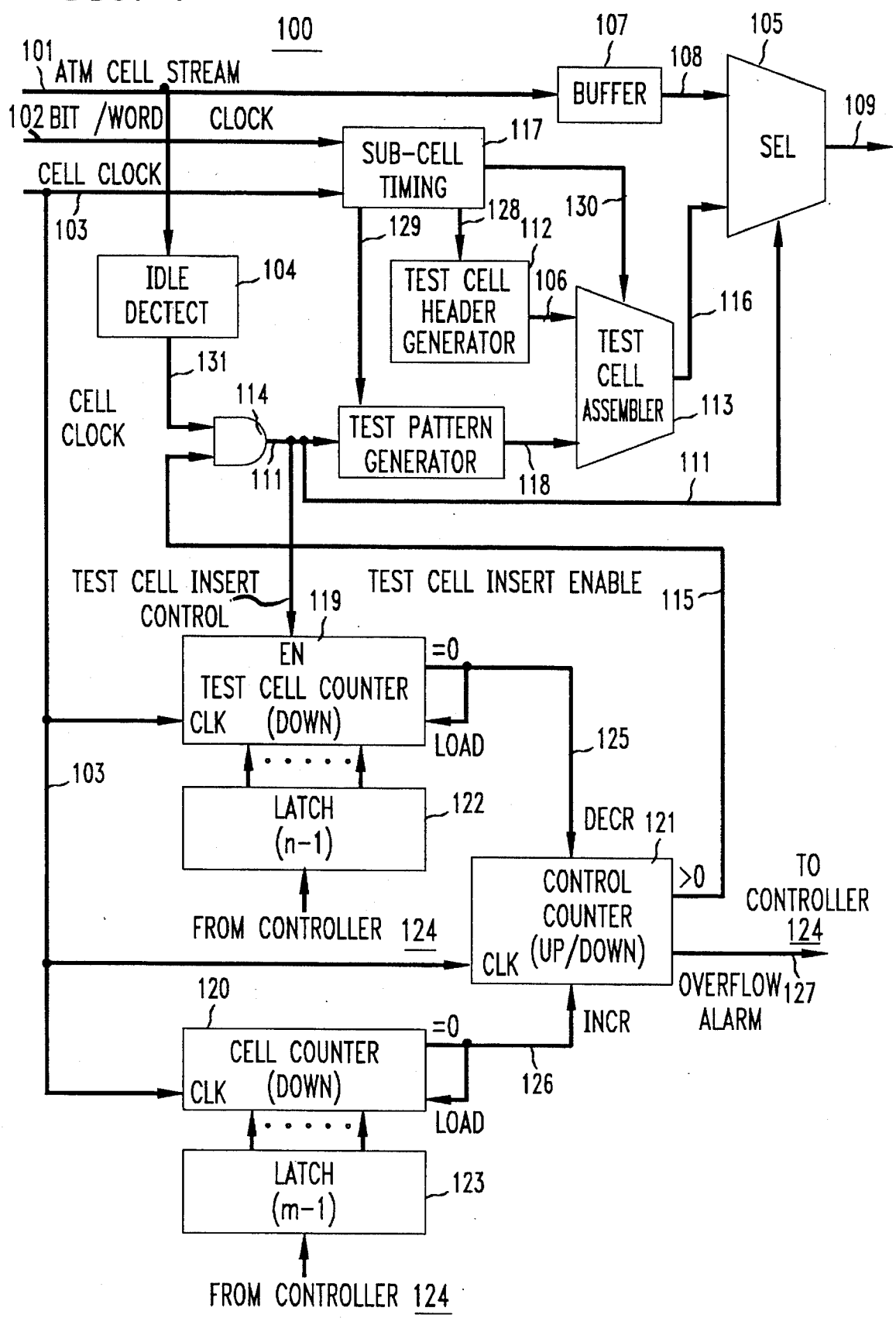
FIG. 1 shows, in simplied block diagram form, a test cell generator arrangement including an embodiment of the invention.

FIG. 1 shows, in simplified block diagram form, test cell generator arrangement 100 including an embodiment of the invention. A received ATM cell stream is supplied via path 101 to idle detect unit 104 and buffer 107. The received ATM cell stream contains a continuous stream of ATM cells which, in general, include idle cells and non-idle cells. For the purposes of this explanation, it is assumed that the incoming ATM line rate is 155.52 Mb/s, which is known as the STM-1 rate, although the invention is not limited in this regard. The ATM cell stream is accompanied by a Bit/Word Clock which, depending on the particular implementation, may be a clock at the bit rate of the ATM cell stream if the implementation is a serial one or, more typically, a sub-multiple of the ATM cell stream bit rate if the data are carried on a parallel bus. The Bit/Word Clock is supplied via path 102 to sub-cell timing unit 117. In addition, a Cell Clock is present, which provides information that identifies the boundaries of the fixed-length cells. The Cell Clock is supplied via path 103 to sub-cell timing unit 117, test cell counter 119, cell counter 120 and control counter 121. The Bit/Word Clock and Cell Clock are derived from the line rate, in this example the STM-1 rate of 155.52 Mb/s, in a known fashion.

Idle detect unit 104 makes a determination, based on the contents of the header of the cell, whether an incoming cell is an idle cell. This is achieved in a known fashion by comparing the received cell header to an expected idle cell pattern. For example, an ATM idle cell has a distinct header as defined in CCITT Recommendation I.361 entitled B-ISDN ATM Layer Specification. Idle detect unit 104 generates an active idle cell indication signal (logic 1) when it detects such an idle cell. The resulting idle cell indication signal is supplied via path 131 to AND gate 114, where it is combined with a Test Cell Insert Enable signal (i.e., a second control signal) supplied via path 115 from control counter 121 to produce a Test Cell Insert Control signal (i.e., a first control signal). The Test Cell Insert Control signal is supplied via path 111 to test pattern generator 110, selector 105 and test cell counter 119. If the Test Cell Insert Control signal is active (i.e., a logic 1) then, and only then, does selector 105 choose an assembled test cell being supplied from test cell assembler 113 to be supplied as an output to path 109. If the incoming cell is not idle, or if the Test Cell Insert Enable signal is not active (i.e., a logic 0), then selector 105 simply passes the signal on path 108 from buffer 107, and which signal is a delayed version of the incoming ATM cell stream, as an output to path 109. This is in accordance with the function of this arrangement, whereby generation and insertion of test cells only occurs when idle cells are present on the incoming data stream; otherwise the cells of the incoming data stream are to be passed through transparently. The cells from buffer 107 are unchanged except for the fixed delay inserted by buffer 107. Buffer 107 is necessary since it takes some part of a cell time for the idle detect unit 104 to make the determination whether the incoming cell is an idle cell.

Under some conditions, it may be known a priori that the incoming ATM cell stream on path 101 does not contain any useful ATM cells. For example, incoming ATM line may be disconnected or disabled. In such a situation, every cell interval is a test cell insertion opportunity, regardless of whether or not it is an idle cell interval.

This condition can readily be accommodated by simply forcing the output of idle detect unit 104, carried on path 131, to be always active, regardless of whether an idle cell has actually been detected. Thus, this situation is not treated as a separate condition hereinafter.

When enabled by the Test Cell Insert Control signal, test pattern generator 110 creates the test signal that is to be inserted into the payload of the individual test cells. A typical manifestation of test pattern generator 110 generates a pseudo-random bit sequence, sometimes called a PN pattern, which sequence continues across successive test cells. However, any suitable test pattern, fixed or cyclical, may be used for this purpose and this invention is not limited in this regard. The test pattern created by test pattern generator 110 is inserted into the payload of the test cell. In addition, supplementary information such as a sequence number or an error detection code based on the test pattern may also be inserted into the payload of the cell. For the purposes of this explanation and without so limiting the scope of this invention, it may be assumed that these auxiliary functions are incorporated into test pattern generator 110.

Test cell header generator 112 generates the header of the test cell, which typically contains routing and destination information, other information related to operations and maintenance, and a header error detection and correction code. The test cell header is supplied on path 106, while the test pattern and other payload information are supplied on path 118 to test cell assembler 113, where they are combined into a test cell. The sequencing of this test cell assembly is performed by sub-cell timing unit 117, which synchronizes the test cell creation and assembly to the incoming Bit/Word Clock and Cell Clock, and sends timing control signals via paths 128, 129 and 130 to coordinate test cell header generator 112, test pattern generator 110 and test cell assembler 113, respectively, that create the various components of the test cell. The resulting test cell is supplied via path 116 to selector 105 and, in turn, is supplied as an output to path 109 when the Test Cell Insert Control signal is active.

The preceding discussion describes primarily the detection of test cell insertion opportunities and the steps in the creation and insertion of test cells into the combined data stream. The mechanism whereby the bandwidth of the test cells to be inserted is controlled and maintained at a predetermined average rate, in accordance with the principles of this invention, is now described in the discussion following.

The arrangement of the test cell counter 119, cell counter 120 and control counter 121, shown in FIG. 1, are central to the variable bandwidth insertion capability of test cell generator arrangement 100. This combination of counters 119, 120 and 121 produces, in accordance with the principles of the invention, the Test Cell Insert Enable signal, in response to the Test Cell Insert Control signal. If the average rate of test cell insertion is lower than or equal to the desired predetermined rate, the Test Cell Insert Enable signal is kept active, thereby enabling test cell insertion at every opportunity (i.e., during every idle cell interval). If the average rate of test cell insertion is greater than the desired predetermined rate, the Test Cell Insert Enable signal is made inactive, thereby temporarily disabling the insertion of any test cells and reducing the average test cell insertion rate. This feedback process is described in more detail below.

Assume that as a starting condition counters 119 and 120 are loaded with the values n−1 and m−1, respectively, and the desired test cell insertion rate is n/m×C, where C is the Cell Clock rate, i.e., the number of cells per unit time on an input or output line of the system. Since, the test cell insertion rate cannot exceed the total line rate, n must be less than m. Latches 122 and 123 are programmed initially, by controller 124 (not shown), for example, to the values n−1 and m−1, respectively, to effect the desired test cell insertion rate. Counters 119 and 120 are reloaded with these values from latches 122 and 123, respectively, when counters 119 and 120, which are shown for illustration as "countdown-mode" counters, count down to zero. That is to say, counters 119 and 120 are loaded with their respectively initial count values at the end of their respective count cycles.

Assume further than control counter 121 is initially set to zero. Control counter 121 is shown as an Up/Down counter, which increments when it receives an active signal on its increment (INCR) control path 126 and decrements when it receives an active signal on its decrement (DECR) control path 125. If control counter 121 receives active signals on its increment path 126 and its decrement path 125 simultaneously, it retains its previous count value. All of counters 119, 120 and 121 operate synchronously with the Cell Clock supplied via path 103.

Let one "counting cycle" for cell counter 120 be defined as m cell intervals. Then, over one counting cycle of m cells, cell counter 120 will cycle once and, then, supply an active output to increment path 126, since it counts down by one for every Cell Clock interval. Control counter 121 will increment in response to the active state supplied on path 126, thereby activating the Test Cell Insert Enable signal, and insertion of test cells will then commence with the following counting cycle, as described above.

Let us first consider the case when there are sufficient idle cells on the incoming ATM cell stream on path 101 so that all n desired test cells may be inserted in one counting cycle of cell counter 120. Then, after the first n such idle cells in the counting cycle of cell counter 120, n test cells will have been inserted. Test cell counter 119 counts these test cell insertions, since it is only enabled when the Test Cell Insert Control signal supplied via path 111 is active which, in turn, is only activated when a test cell is actually inserted. Thus, when test cell counter 119 counts down to zero at the $n^{th}$ test cell insertion, it supplies an active output to decrement path 125. This decrements the control counter 121 back to zero, which deactivates the Test Cell Insert Enable signal, thereby disabling further test cell insertion for that counting cycle of cell counter 120. At the commencement of the next counting cycle, cell counter 120 once again supplies an active output via path 126 which increments control counter 121. Then, the test cell insertion cycle repeats, with n test cells being inserted every m cell intervals. This achieves the desired test cell rate of n/m×C. The "counting cycle for test cell counter 119, therefor, is n test cell insertions.

However, as mentioned earlier, the presence of idle cells is not guaranteed at all times, since the occupancy of cells in a packetized cell stream is statistical in nature. Thus, although the average rate of idle cells on input 101 must, of course, be at least equal to the average test cell insertion rate over an extended period of time, there is no guarantee that this condition will be met over a shorter interval, such as one counting cycle of cell counter 120. Some retention of this information, i.e., the fact that all n test cells were not inserted in m cell intervals, is needed, therefore, to maintain the desired predetermined average test cell insertion rate over temporary shortages in test cell insertion opportunities in the form of idle cells. This retention of information is provided by control counter 121. If, during one counting cycle of cell counter 120, n test cells have not been inserted, then control counter 121 is not decremented and simply continues to be incremented further with each successive counting cycle of cell counter 120. Since the Test Cell Insert Enable signal is active whenever the count value of control counter 121 is greater than one, test cell insertion is continuously enabled. This allows test cell insertion at a rate temporarily greater than the desired predetermined average rate of n/m×C. Once the incidence of idle cell occurrence has increased, the decrement rate of the control counter 121 then temporarily exceeds its increment rate until such time as the additional test cell insertion catches up with the desired predetermined average rate required and control counter 121 once again is decremented to zero.

The maximum sizes of counters 119, 120 and 121 is determined by the requirements on the minimum and maximum bandwidth of the test signal to be generated, and the required resolution or increment of the bandwidth.

The maximum size, M, of cell counter 120 may be determined by observing that (a) the smallest test cell insertion rate possible is with n=2, m=M, or 2/m×C, and (b) the smallest increment in test cell insertion rate possible is 1/m×C. The system requirement on these two parameters that yields the larger value for M will determine the size of cell counter 120. Typically, the value of M is increased to the next larger power of 2 for common implementations of counters with binary logic.

Similarly, the maximum size, N, of test cell counter 119, may be determined by observing that the largest test cell insertion rate possible, while still maintaining the resolution of test cell rates, is N/M×C.

The maximum size, K, of control counter 121 may be determined by the burstiness and loading of the traffic expected. Under conditions of high loading and high burstiness, control counter 121 may need to retain several accumulated counting cycles during which insufficient test cells were generated.

In FIG. 1, an Overflow Alarm signal is shown as being supplied on path 127, which is activated should control counter 121 overflow. This Alarm Overflow signal may, for example, be processed by controller 124 and either raise an alarm to an operator or adaptively lower the test cell insertion rate, in accordance with an aspect of the invention, as described below.

Since n cells are inserted at the first n opportunities every m Cell Clock times, and n and m are both programmable, test cell generator arrangement 100 also provides, in accordance with an aspect of the invention, control over the burstiness of the generated test cell traffic. As an example, if the desired test cell insertion rate were 25% of the line capacity, i.e., 0.25C, this could be generated with n=2, m 32 8, or with n=50, m=200, etc., limited only by the size of counters 119 and 120. These values of n and m would give the same average test cell insertion rate (0.25 C in this example), but the burstiness of the resulting traffic varies significantly. In particular, this feature may be used as an enhanced test to verify the performance of the system or network under test in the presence of traffic with the same average rates, but with differing peak rates.

Since latches 122 and 123 may be programmed, and may even be reprogrammed while the circuit is operational, the invention as shown is particularly suitable to adaptive control of the test cell insertion rate. As an example, if control counter 121 were to overflow and cause an alarm, one of the actions that controller 124 could take is to reduce the test cell insertion rate adaptively, within prescribed bounds or per a prescribed schedule.

In a remote location, reception of test cells is detected and, then, the received test pattern is compared, in well known fashion, to the expected test pattern to determine if there are errors.

The above-described arrangements are, of course, merely illustrative of the application of the principles of the invention. Other arrangements may be devised by those skilled in the art without departing from the spirit or scope of the invention.

I claim:

1. Apparatus for inserting test cells in a data stream comprising:

means for detecting test cell insertion intervals in the data stream and for generating a test cell insertion control signal only upon detection of a test cell insertion interval;

means responsive to a cell clock signal and a first control signal for detecting an average rate of test cells being inserted into the data stream and for generating a test cell insertion enable control signal when said detected average rate of test cell insertion is equal to or less than a predetermined value and for generating a test cell insertion disable control signal otherwise;

means responsive to said test cell insertion control signal and said test cell insertion enable control signal for generating said first control signal only when said detected average rate of insertion is equal to or less than said predetermined value; and means responsive to said first control signal for generating test cells and for inserting said generated test cells into the data stream, wherein said predetermined average test cell insertion rate is obtained.

2. Apparatus as defined in claim 1 wherein said means for detecting test cell insertion intervals includes means for detecting idle cells in the data stream and for generating said test cell insertion control signal indicating that an idle cell has been detected.

3. Apparatus as defined in claim 2 wherein said combined data stream is an asynchronous transfer mode (ATM) combined data stream.

4. Apparatus as defined in claim 2 wherein said means for detecting said average rate of test cell insertion and for generating said test cell insertion enable control signal includes means responsive to said cell clock signal for generating a first indication that a first predetermined number of cell intervals of the data stream has occurred, means responsive to said first control signal and to said cell clock signal for generating a second indication indicative that a second predetermined number of test cells has been inserted into the data stream during said first predetermined number of test cell intervals and means responsive to said first indication and said second indication for generating said test cell insertion enable control signal when said predetermined second number of test cells has not been inserted during said first predetermined number of cell intervals.

5. Apparatus as defined in claims 4 wherein said means for generating said first indication comprises first counter means for yielding said first indication upon counting said first predetermined number, said means for generating said second indication comprises second counter means for yielding said second indication upon counting said second predetermined number and said means for detecting said average rate of test cell insertion and for generating said test cell insertion enable control signal comprises counter means supplied with said first and second indications for generating said test cell insertion enable control signal to enable generation and insertion of test cells so long as a count of said first indications is greater than a count of said second indications.

6. Apparatus as defined in claim 5 wherein said first predetermined number is not less than said second predetermined number.

7. Apparatus as defined in claim 5 wherein said counter means for generating said second control signal is an up/down counter.

8. Apparatus as defined in claim 7 wherein said first counter means comprises a programmable counter programmed to count said first predetermined number and said second counter means comprises a programmable counter programmed to count said second predetermined number.

9. Apparatus as defined in claim 8 further including means for adjusting said first predetermined number and/or said second predetermined number.

10. Apparatus as defined in claim 9 further including means for adaptively adjusting said first predetermined number and/or said second predetermined number.

11. A method for inserting test cells in a data stream, comprising the steps of:

detecting test cell insertion intervals in a data stream;

generating a test cell insertion control signal only upon detection of a test cell insertion interval;

in response to a cell clock signal and a first control signal, detecting an average rate of test cells being inserted into the data stream;

generating a test cell insertion enable control signal when said detected average rate of test cell insertion is equal to or less than a predetermined value and for generating a test cell insertion disable control signal otherwise;

in response to said test cell insertion control signal and said test cell insertion enable control signal, generating said first control signal only when said detected average rate of insertion is equal to or less than said predetermined rate of value; and in response to said first control signal, generating and inserting test cells into the data stream, wherein said predetermined average test cell insertion rate is obtained.

12. The method as defined in claim 11 wherein said step of detecting test cell insertion intervals includes the step of detecting idle cells in the data stream and wherein said step of generating a test cell insertion control signal generates said test cell insertion control signal indicating that an idle cell has been detected.

13. The method as defined in claim 12 wherein said combined data stream is an asynchronous transfer mode (ATM) combined data stream.

14. The method as defined in claim 12 wherein said step of generating said test cell insertion enable control signal includes the steps of in response to said cell clock signal, generating a first indication that a first predetermined number of cell intervals of said data stream has occurred, in response to said first control signal and said cell clock signal, generating a second indication indicative that a second predetermined number of test cells has been inserted in the data stream and in response to said first indication and said second indication generating said test cell insertion enable control signal when said predetermined second number of test cells has not been inserted during said first predetermined number of cell intervals.

15. The method as defined in claim 14 wherein said step of generating said first indication yields said first indication upon counting said first predetermined number, said step of generating said second indication yields said second indication upon counting said second predetermined number and said step of generating said test cell insertion enable control signal in response to said first and second indications generates said test cell insertion enable control signal to enable generation and insertion of test cells so long as a count of said first indications is greater than a count of said second indications.

16. Apparatus as defined in claim 15 wherein said first predetermined number is not less than said second predetermined number.

17. Apparatus as defined in claim 15 further including a step of adjusting said first predetermined number and/or said second predetermined number.

18. Apparatus as defined in claim 17 further including a step of adaptively adjusting said first predetermined number and/or said second predetermined number.

* * * * *